United States Patent
Kim

(10) Patent No.: US 8,332,674 B2
(45) Date of Patent: Dec. 11, 2012

(54) METHOD AND APPARATUS FOR NETWORK COMMUNICATIONS OVER HDMI IN STANDBY MODE

(75) Inventor: Ji-won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 12/693,054

(22) Filed: Jan. 25, 2010

(65) Prior Publication Data

US 2011/0113264 A1    May 12, 2011

(30) Foreign Application Priority Data

Nov. 11, 2009    (KR) ................ 10-2009-0108669

(51) Int. Cl.
*G06F 1/32* (2006.01)
*G06F 1/00* (2006.01)
(52) U.S. Cl. .................... 713/320; 713/300; 713/323
(58) Field of Classification Search .............. 713/320
See application file for complete search history.

(56) References Cited

U.S. PATENT DOCUMENTS

| | | | | |
|---|---|---|---|---|
| 6,144,566 A | * | 11/2000 | Keller | 363/21.12 |
| 6,229,724 B1 | * | 5/2001 | Virtanen | 363/89 |
| 6,947,296 B2 | * | 9/2005 | Hirosawa | 363/20 |
| 7,512,396 B2 | * | 3/2009 | Han et al. | 455/343.1 |
| 7,586,548 B2 | * | 9/2009 | Libera | 348/730 |
| 7,971,085 B2 | * | 6/2011 | Kim | 713/324 |

OTHER PUBLICATIONS

Han et al, Service-Oriented Power Management for an Integrated Multi-Function Home Server, Feb. 2007, IEEE, vol. 53, pp. 204-208.*
Jeong et al, A Network Level Power Management for Home Network Devices, Apr. 14, 2008, IEEE, vol. 54, pp. 487-493.*

* cited by examiner

*Primary Examiner* — Suresh Suryawanshi
(74) *Attorney, Agent, or Firm* — Sughrue Mion, PLLC

(57) ABSTRACT

Provided are an apparatus and method thereof for providing standby power for Ethernet communications between a High-Definition Multimedia Interface (HDMI) device and an Ethernet device. The apparatus includes: an HDMI switch which is connected to the HDMI device; an Ethernet switch which is connected to the HDMI switch and the Ethernet device; a standby mode power switch operable to switch standby power to the Ethernet switch; and a primary power source operable to provide primary power to the Ethernet switch; a standby power source operable to provide the standby power to the Ethernet switch via the standby mode power switch; and a controller operable to receive the control signal from the HDMI device and to control to the standby mode power switch, wherein if the control signal is received, the controller controls the standby mode power switch to switch the standby power to the Ethernet switch.

18 Claims, 4 Drawing Sheets

METHOD AND APPARATUS FOR NETWORK COMMUNICATIONS OVER HDMI IN STANDBY MODE

BACKGROUND OF THE INVENTION

1. Field of the Invention

Apparatuses and methods consistent with the present invention relate to facilitating a low power standby mode for Ethernet communications over a High-Definition Multimedia Interface (HDMI) connection.

2. Description of the Related Art

Recently, the HDMI specification (e.g., version 1.4, a publicly available specification that is hereby incorporated by reference) has changed so as to incorporate an Ethernet channel, which allows for an Ethernet connection between HDMI connected devices.

FIG. 1 shows an example of several external devices (shown collectively as "101") connected to a television (TV) 100 via respective HDMI interfaces (shown collectively as "102"). Since each HDMI interface includes an Ethernet channel, extra local area network (LAN) cables are not needed for Ethernet communications between the devices, or, if the TV 100 is connected to an external Ethernet network 103, from one of the devices to the external Ethernet network. In this case, the TV 100 serves as the hub of Ethernet communication.

In particular, the TV 100 must include an Ethernet hub or switch 104 in order to facilitate Ethernet communications among the external devices and external Ethernet network(s). For simplicity, the Ethernet hub or switch 104 is shown as having both HDMI ports into which both the HDMI interfaces 102 and the Ethernet network 103 connect.

However, if the TV 100 is powered off, i.e., in a standby mode, power must continually be supplied to the Ethernet hub or switch 104 so that the external devices 101 can continue to communicate with each other and/or the external Ethernet network 103. Such a configuration may be wasteful though, since power may be unnecessarily consumed whenever Ethernet communications are not needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An exemplary embodiment of the present invention provides a display apparatus for providing standby power for Ethernet communications between an external High-Definition Multimedia Interface (HDMI) device and an external Ethernet device, and the display apparatus may include: an HDMI port operable to connect to the external HDMI device and to receive an external control signal from the external HDMI device; an Ethernet switch operable to connect the external HDMI device to the external Ethernet device via the HDMI port; a standby mode power switch operable to switch standby power to the Ethernet switch; and a controller operable to receive the external control signal from the external HDMI device via the HDMI port and to control to the standby mode power switch, wherein if the external control signal is received by the controller, the controller controls the standby mode power switch to switch the standby power to the Ethernet switch.

The display apparatus may further include: a primary power source operable to supply primary power to the Ethernet switch; and a secondary power source operable to supply the secondary power to the Ethernet switch.

If the display apparatus is in a normal operating mode, the primary power source supplies the primary power to the Ethernet switch, and wherein if the display apparatus is in a standby operating mode, the primary power source does not supply the primary power to the Ethernet switch.

The display apparatus may be a television.

The standby mode power switch may be a low-dropout (LDO) regulator or a DC-DC converter.

The display apparatus may further include: an HDMI switch which provides an interface between the external HDMI device and the Ethernet switch via the HDMI port, wherein the HDMI switch converts HDMI signals from the external HDMI device to Ethernet signals for communicating with the external Ethernet device via the Ethernet switch, and wherein the HDMI switch converts Ethernet signals from the external Ethernet device to HDMI signals for communicating with the external HDMI device via the HDMI port.

The external control signal received from the external HDMI device may be a Consumer Electronics Control (CEC) signal.

An exemplary embodiment of the present invention provides a method for providing a standby power for Ethernet communications between an external High-Definition Multimedia Interface (HDMI) device, which is connected to a display apparatus having an HDMI port, and an external Ethernet device connected to the display apparatus, and the method may include: receiving an external control signal from the external HDMI device connected to the HDMI port; and switching the standby power to an Ethernet switch so that the Ethernet switch is powered by the standby power in response to the receiving of the external control signal.

The method may further include: determining whether the display apparatus changes from a standby operating mode to a normal operating mode; switching off the standby power to the Ethernet switch if the display apparatus is in the normal operating mode; and if the display apparatus is in the normal operating mode, switching on a primary power source to provide a primary power to the Ethernet switch so that the Ethernet switch is powered by the primary power.

The method may further include: switching off the standby power to an Ethernet switch if the external control signal is not received.

Another exemplary embodiment of the present invention provides a television, which operates in one of a normal operating mode and a standby operating mode, and which provides for Ethernet communications between an external High-Definition Multimedia Interface (HDMI) device and an external Ethernet device, the television including: an HDMI switch operable to connect to the external HDMI device; an Ethernet switch operable to connect the external HDMI device to the external Ethernet device via the HDMI port; a standby mode power switch operable to switch standby power to the Ethernet switch; and a primary power source operable to provide power to the television during the normal operating mode; a standby power source operable to provide the standby power to the Ethernet switch during the standby operating mode via the standby mode power switch; and a controller operable to receive an external control signal from the external HDMI device and to control to the standby mode power switch, wherein if the television is in the standby operating mode and the external control signal is received by the controller, the controller may control the standby mode power switch to switch the standby power to the Ethernet switch.

If the television changes to the normal operating mode and the standby power is switched to the Ethernet switch, the controller may control the standby mode power switch to switch off the standby power to the Ethernet switch.

Another exemplary embodiment of the present invention provides an apparatus which provides for Ethernet communications between a High-Definition Multimedia Interface (HDMI) device and an Ethernet device, the apparatus including: an HDMI switch which is connected to the HDMI device; an Ethernet switch which is connected to the HDMI switch and the Ethernet device; a standby mode power switch operable to switch standby power to the Ethernet switch; a primary power source operable to provide primary power to the Ethernet switch; a standby power source operable to provide the standby power to the Ethernet switch via the standby mode power switch; and a controller operable to receive the control signal from the HDMI device and to control to the standby mode power switch, wherein if the control signal is received, the controller may control the standby mode power switch to switch the standby power to the Ethernet switch.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
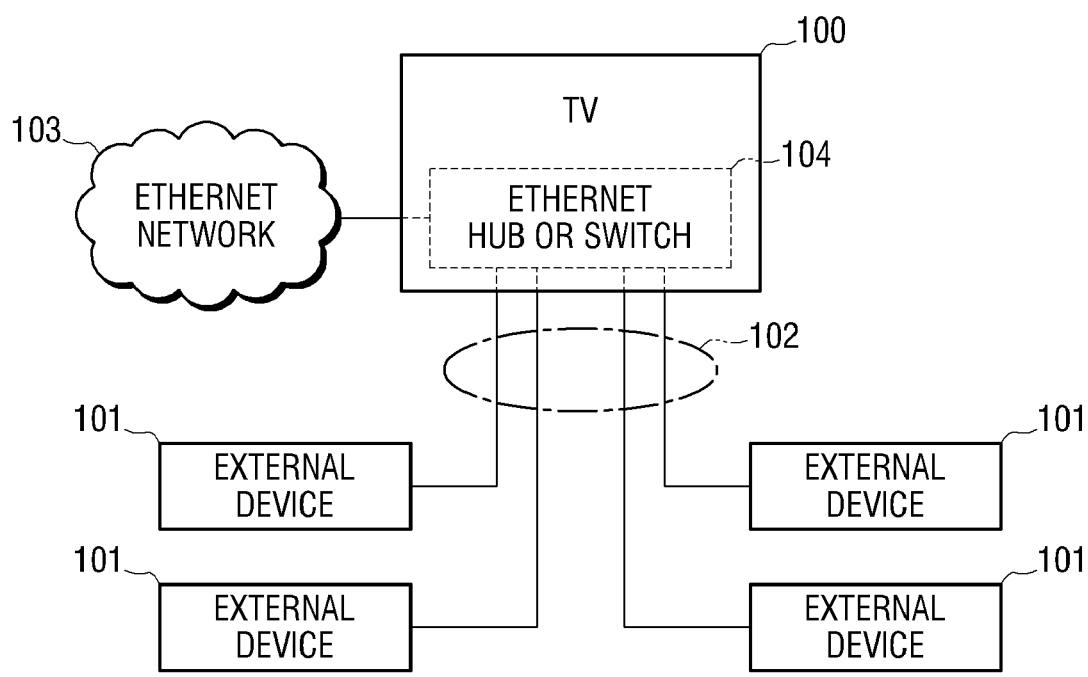
FIG. 1 illustrates an example of a related art apparatus.
Figure 2:
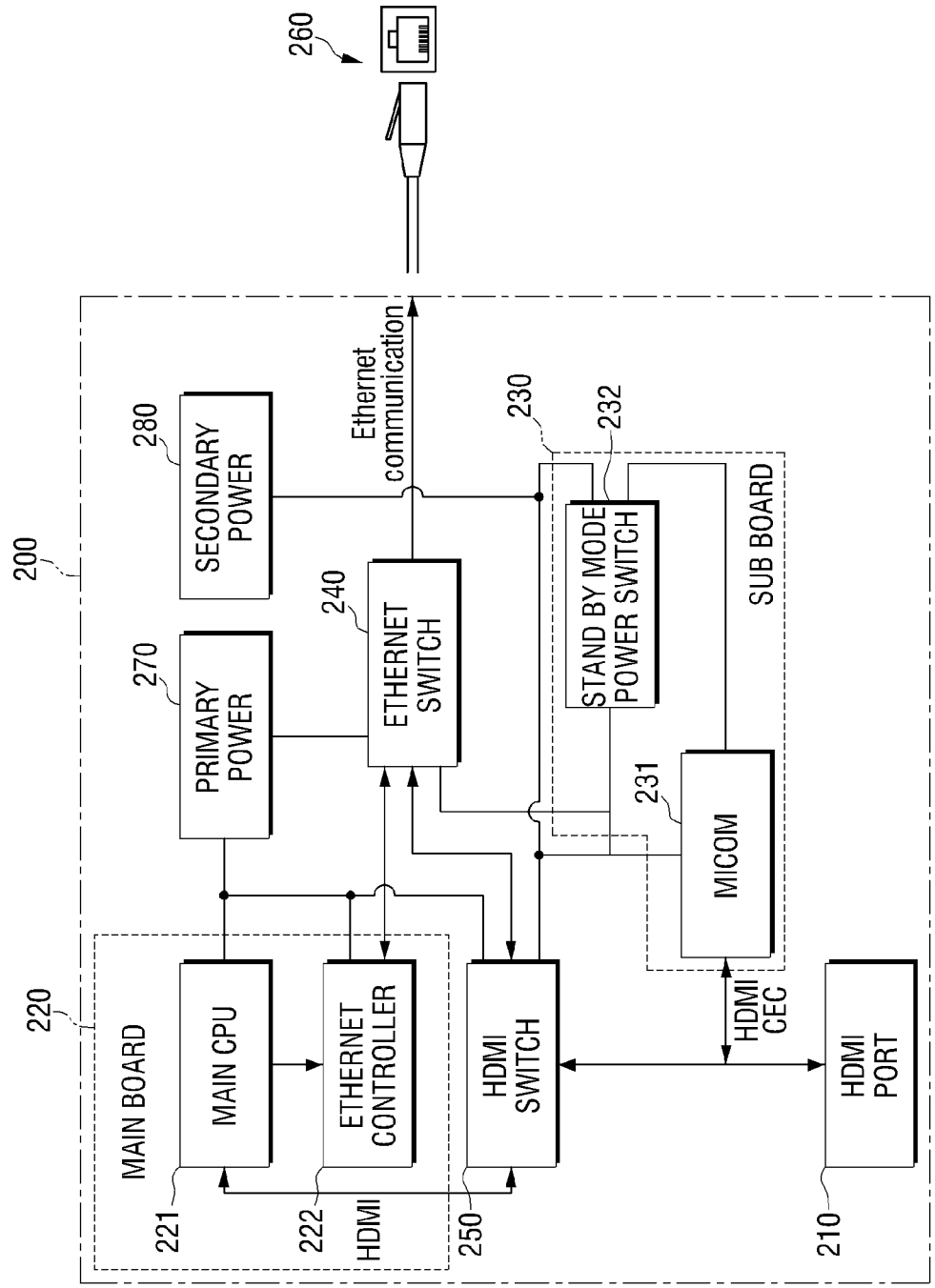
FIG. 2 illustrates an example of an apparatus according to an exemplary embodiment of the present invention.

A display apparatus according to an exemplary embodiment of the present invention is shown in FIG. 2. As shown in the figure, a display apparatus 200 is connected to at least one external HDMI device via at least one HDMI port 210. The display apparatus 200 may further include a main board 220 and a sub-board 230. The display apparatus 200 may further include an Ethernet switch 240 and an HDMI switch 250. The display apparatus 200 may be connected to an external Ethernet device connected via an Ethernet port 260. It should be noted that the external Ethernet device may be a standalone device capable of communicating via Ethernet, or it may be a plurality of Ethernet devices, for example, via an Ethernet hub or switch. Finally, the display apparatus 200 includes a primary power source 270 and a secondary power source 280 for providing a power source during a normal operating mode and a standby operating mode, respectively.

It should be noted that while the exemplary embodiment shown in FIG. 2 shows a main board 220 and a sub-board 230, this depiction is merely shown for convenience so as to distinguish between which components may receive primary power and which components receive secondary, or standby power. One of skill in the art would readily understand that all of the above-noted components could be included on a single circuit board, or the components might be arranged differently among multiple circuit boards.

Further, in FIG. 2, the power sources are shown as connecting directly to internal components of a board (e.g., the connection from the primary power source 270 to the CPU 221 of the main board 220), however, one of skill in the art would understand that the power sources may simply be connected to each board, in which case each board could route the provided power to its respective internal components, in accordance with the operation of the exemplary embodiments of the present invention.

It should also be pointed out that in FIG. 2 the HDMI switch 250 and the Ethernet switch 240 are not shown as being part of either the main board 220 or the sub-board 230. In this example, these components are not shown as part of either board since in this exemplary embodiment, they require power connectivity to both the primary power source 270 and the secondary power source 280. Again, this is merely one example of a possible configuration of the above-noted components, and the present invention is not limited to this configuration.

According to the exemplary embodiment of the present invention, the main board 220 may include all of the components the display apparatus 200 might utilize in a normal operating mode to facilitate HDMI/Ethernet communications. For example, the main board 220 may include a main CPU 221, and an Ethernet controller 222 that would enable the main board 220 to be able to communicate between an external HDMI device connected to an HDMI port 210 and an external Ethernet device connected via an Ethernet port 260. The components of the main board receive power from the primary power source 270.

According to the exemplary embodiment of the present invention, the sub-board 230 may include a micro-computer 231 ("micom") (e.g., controller, cpu, etc.), and a standby mode power switch 232. The sub-board receives power from the secondary power source 280. The micom 231 and the 232 are arranged so as to provide the standby power to the component It should be noted that for the sake of simplicity, the main board 220 and sub-board 230 are shown in FIG. 2 having only a few basic components (e.g., CPU, micom, etc.). However, one of skill in the art would readily understand that other components normally found in a display apparatus could be included, eliminated and/or consolidated. For example, the display apparatus could include multiple HDMI ports connectable to multiple HDMI-ready devices, or additional Ethernet ports connected to multiple external Ethernet devices.

During a normal operation, all of the above-noted components of the main board 220 would receive power from a primary power source 270. In addition, the HDMI switch 250 and the Ethernet switch 240 would also have to receive power from the primary power source 270 so as to be able to communicate with any external devices. In other words, if a user required Ethernet communications during normal operation of the display apparatus (e.g., while watching the display screen), between an external device connected via the HDMI port 210 and an external Ethernet device connected via the Ethernet port 260, a connection could be established through the Ethernet switch 240 and the HDMI switch 250.

During a standby operation of the display apparatus (e.g., when the user switches the display device off), the primary power source 270 would switch off (and thus the power to the main board 220 and its components would also switch off), and the secondary power source 280 would switch on. In such a case, the secondary power source 280 could provide standby power to the HDMI switch 250 and the micom 231.

However, since the display apparatus is in standby mode, power may not be required for the Ethernet switch 240. For example, if there are no external HDMI devices connected to the HDMI port 210 requiring communication with any external Ethernet devices connected to the Ethernet port 260 (or vice versa), there is no need for the Ethernet switch 240 to consume power. On the other hand, if there is a need for communications between external devices, the Ethernet switch 240 will require power to facilitate the desired communications.

To accomplish this, the exemplary embodiment provides for receiving a Consumer Electronics Control (CEC) signal from an external HDMI device connected to the HDMI port. If the display apparatus is in standby mode, and the micom 231 detects that the CEC signal is received from the external HDMI device, the micom 231 sends an internal control signal to the standby mode power switch 232. As shown in FIG. 2, the standby mode power switch 232 is connected to the secondary power source 280. If the standby mode power switch 232 receives the internal control signal from the micom 231, the internal control signal switches the secondary power source 280 to the Ethernet switch 240, thereby powering the Ethernet switch 240. Once the Ethernet switch 240 receives power from the secondary power source 280, a communication link can be established between the external HDMI device and the external Ethernet device.

The standby mode power switch 232 can be any sort of device which can facilitate the switching of the secondary power source 280 to the Ethernet switch 240. For example, the standby mode power switch 232 could be a low-dropout (LDO) or a DC-DC switching converter. During the standby mode, the standby mode power switch 232 should be able to receive the internal control signal from the micom 231 and then switch the secondary power source to the Ethernet switch 240. During the normal operating mode, the standby mode power switch 232 is inactive since the sub-board (i.e., the components thereof) receives no operating power.

Figure 3:
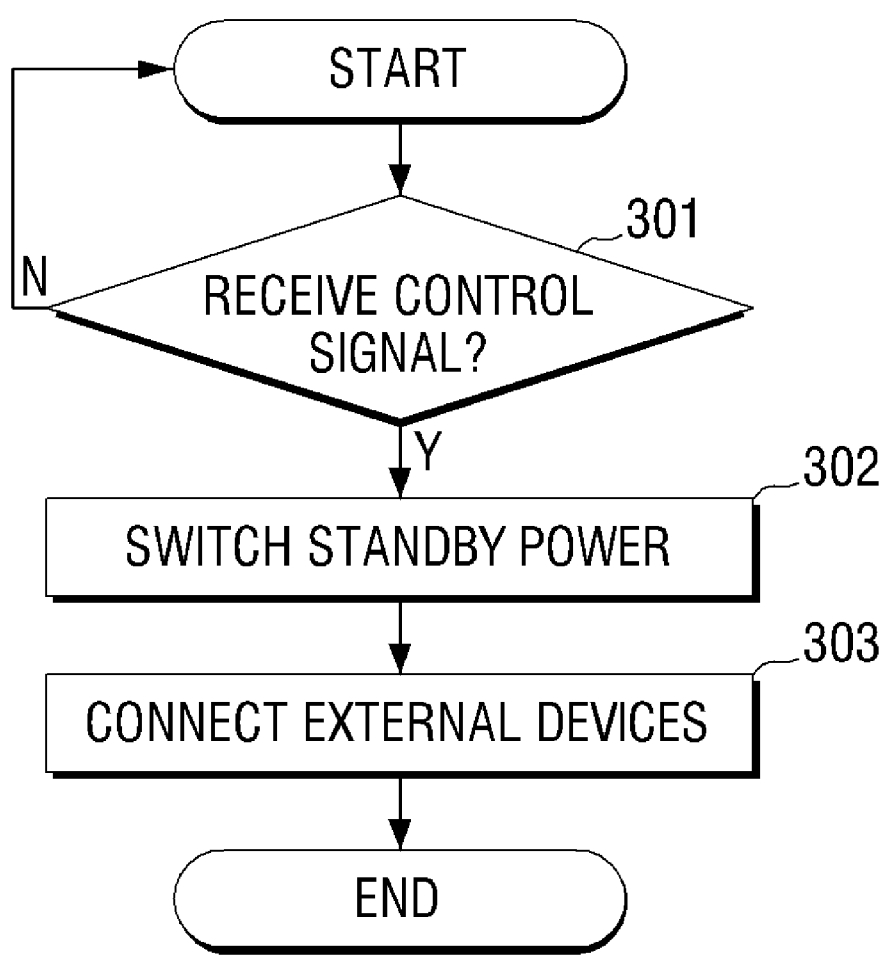
FIG. 3 illustrates an example of an operation of an apparatus according to an exemplary embodiment of the present invention.

An operation according to an exemplary embodiment of the present invention is shown in FIG. 3. While in standby mode (i.e., while standby power is supplied from the secondary power source 280 to the components of the sub-board 230 as noted above), if an external control signal (e.g., the CEC signal) is received from the external HDMI device (S301-Y) the micom sends the internal control signal to the standby mode power switch 232, whereupon the standby mode power switch 232 switches the standby power source to the Ethernet switch 240 (S302). Once powered by the standby power source, the Ethernet switch 240 can then facilitate the communication link between the external HDMI device and the external Ethernet device (S303).

Figure 4:
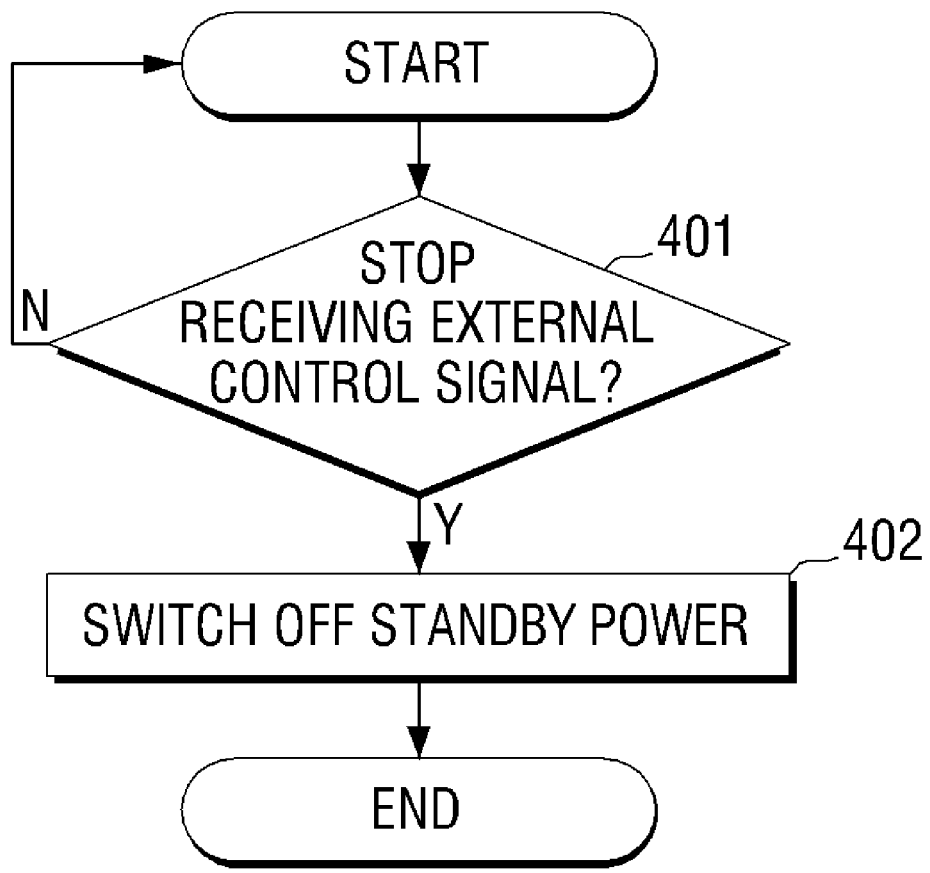
FIG. 4 illustrates an example of an operation of an apparatus according to an exemplary embodiment of the present invention.

FIG. 4 shows another operation according to an exemplary embodiment of the present invention. While in standby mode, if the micom 231 stops receiving the external control signal (e.g., the CEC signal) (S401-Y), the micom 231 reacts by stopping the sending of the internal control signal to the standby mode power switch 232. The standby mode power switch 232 then switches off the standby power from being applied to the Ethernet switch 240 (S402).

The display apparatus described herein can be any sort of display apparatus, such as a television or a monitor, etc. Additionally, while the above exemplary embodiments describe a display apparatus, it should be noted that the present invention can be equally applied to any device which facilitates communications between external HDMI and external Ethernet devices, and has a normal operating mode powered by a primary power source, and a standby operating mode powered by a secondary power source.

It should be noted that the term "Ethernet," as used herein, includes all of the different varieties of Ethernet defined in the various IEEE 802.3x Ethernet-related standards (e.g., 10 Mbit/s Ethernet, Fast Ethernet, Gigabit Ethernet, 10-gigabit Ethernet, 100-gigabit Ethernet, etc.). Further, the official Ethernet standards IEEE 802.3x are hereby incorporated by reference. Thus, while HDMI 1.4 may presently include provisioning for 100 Mb/s Ethernet connections, future versions of HDMI may include provisioning for other versions of Ethernet under the IEEE 802.3x standards, or for that matter wireless communication under the 802.11x standards.

For example, a display apparatus may include an 802.11x wireless port which communicates with wireless devices (e.g., wireless internet router), and also an HDMI port which connects to external HDMI-ready devices. Thus, while the exemplary embodiments described herein include Ethernet communications and HDMI 1.4, the general concept of the present invention is not limited thereto. One of skill in the art would understand that the present invention could equally be applied to different networking standards.

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus for providing standby power for Ethernet communications between an external High-Definition Multimedia Interface (HDMI) device and an external Ethernet device, the display apparatus comprising:
   an HDMI port operable to connect to the external HDMI device and to receive an external control signal from the external HDMI device;
   an Ethernet switch operable to connect the external HDMI device to the external Ethernet device via the HDMI port;
   a standby mode power switch operable to switch standby power to the Ethernet switch; and
   a controller operable to receive the external control signal from the external HDMI device via the HDMI port and to control to the standby mode power switch, wherein if the external control signal is received by the controller, the controller controls the standby mode power switch to switch the standby power to the Ethernet switch.

2. The display apparatus according to claim 1, further comprising:
   a primary power source operable to supply primary power to the Ethernet switch; and
   a secondary power source operable to supply the standby power to the Ethernet switch.

3. The display apparatus according to claim 2, wherein if the display apparatus is in a normal operating mode, the primary power source supplies the primary power to the Ethernet switch, and wherein if the display apparatus is in a standby operating mode, the primary power source does not supply the primary power to the Ethernet switch.

4. The display apparatus according to claim 1, wherein the display apparatus is a television.

5. The display apparatus according to claim 1, wherein the standby mode power switch is a low-dropout (LDO) regulator.

6. The display apparatus according to claim 1, wherein the standby mode power switch is a DC-DC converter.

7. The display apparatus according to claim 1, further comprising:
an HDMI switch which provides an interface between the external HDMI device and the Ethernet switch via the HDMI port, wherein the HDMI switch converts HDMI signals from the external HDMI device to Ethernet signals for communicating with the external Ethernet device via the Ethernet switch, and wherein the HDMI switch converts Ethernet signals from the external Ethernet device to HDMI signals for communicating with the external HDMI device via the HDMI port.

8. The display apparatus according to claim 1, wherein the external control signal received from the external HDMI device is a Consumer Electronics Control (CEC) signal.

9. A method for providing a standby power for Ethernet communications between an external High-Definition Multimedia Interface (HDMI) device, which is connected to a display apparatus having an HDMI port, and an external Ethernet device connected to the display apparatus, the method comprising:
receiving an external control signal from the external HDMI device connected to the HDMI port; and
switching the standby power to an Ethernet switch so that the Ethernet switch is powered by the standby power in response to the receiving of the external control signal.

10. The method according to claim 9, further comprising:
determining whether the display apparatus changes from a standby operating mode to a normal operating mode;
switching off the standby power to the Ethernet switch if the display apparatus is in the normal operating mode; and
if the display apparatus is in the normal operating mode, switching on a primary power source to provide a primary power to the Ethernet switch so that the Ethernet switch is powered by the primary power.

11. The method according to claim 9, wherein the display apparatus is a television.

12. The method according to claim 9, wherein the standby mode power switch is a low-dropout (LDO) regulator.

13. The method according to claim 9, wherein the standby mode power switch is a DC-DC converter.

14. The method according to claim 9, wherein the external control signal received from the external device is a Consumer Electronics Control (CEC) connection.

15. The method according to claim 9, further comprising:
switching off the standby power to an Ethernet switch if the external control signal is not received.

16. A television, which operates in one of a normal operating mode and a standby operating mode, and which provides a standby power for Ethernet communications between an external High-Definition Multimedia Interface (HDMI) device and an external Ethernet device, the television comprising:
an HDMI switch operable to connect to the external HDMI device;
an Ethernet switch operable to connect the external HDMI device to the external Ethernet device via the HDMI port;
a standby mode power switch operable to switch standby power to the Ethernet switch; and
a primary power source operable to provide power to the television during the normal operating mode;
a standby power source operable to provide the standby power to the Ethernet switch during the standby operating mode via the standby mode power switch; and
a controller operable to receive an external control signal from the external HDMI device and to control to the standby mode power switch,
wherein if the television is in the standby operating mode and the external control signal is received by the controller, the controller controls the standby mode power switch to switch the standby power to the Ethernet switch.

17. The television according to claim 16, wherein if the television changes to the normal operating mode and the standby power is switched to the Ethernet switch, the controller controls the standby mode power switch to switch off the standby power to the Ethernet switch.

18. An apparatus which provides a standby power for Ethernet communications between a High-Definition Multimedia Interface (HDMI) device and an Ethernet device, the apparatus comprising:
an HDMI switch which is connected to the HDMI device;
an Ethernet switch which is connected to the HDMI switch and the Ethernet device;
a standby mode power switch operable to switch standby power to the Ethernet switch; and
a primary power source operable to provide primary power to the Ethernet switch;
a standby power source operable to provide the standby power to the Ethernet switch via the standby mode power switch; and
a controller operable to receive the control signal from the HDMI device and to control to the standby mode power switch, wherein if the control signal is received, the controller controls the standby mode power switch to switch the standby power to the Ethernet switch.

* * * * *